(12) United States Patent
Takata et al.

(10) Patent No.: US 12,384,947 B2
(45) Date of Patent: Aug. 12, 2025

(54) BINDER AND BONDED OBJECT

(71) Applicant: Nippon Shokubai Co., Ltd., Osaka (JP)

(72) Inventors: Tomonari Takata, Suita (JP); Yuichi Kawata, Suita (JP)

(73) Assignee: Nippon Shokubai Co., Ltd., Osaka (JP)

( * ) Notice: Subject to any disclaimer, the term of this patent is extended or adjusted under 35 U.S.C. 154(b) by 327 days.

(21) Appl. No.: 17/908,195

(22) PCT Filed: Jan. 19, 2021

(86) PCT No.: PCT/JP2021/001633
§ 371 (c)(1),
(2) Date: Aug. 30, 2022

(87) PCT Pub. No.: WO2021/176866
PCT Pub. Date: Sep. 10, 2021

(65) Prior Publication Data
US 2023/0357608 A1  Nov. 9, 2023

(30) Foreign Application Priority Data

Mar. 3, 2020 (JP) ................. 2020-035947

(51) Int. Cl.
*C09J 133/08* (2006.01)
*C09J 11/04* (2006.01)

(52) U.S. Cl.
CPC ............. *C09J 133/08* (2013.01); *C09J 11/04* (2013.01); *C09J 2301/312* (2020.08)

(58) Field of Classification Search
CPC .... C09J 133/08; C09J 11/04; C09J 2301/312; C09J 2301/408; C09J 2400/14; C09J 2433/00; C09J 129/02; C09J 129/06; C09J 133/02; C09J 133/14; C08K 3/40; C08F 220/06; C08L 33/02; D04H 1/58; D06M 15/263

See application file for complete search history.

(56) References Cited

U.S. PATENT DOCUMENTS

2006/0205852 A1* 9/2006 Tang ................. C08K 3/24
524/422

FOREIGN PATENT DOCUMENTS

| JP | S58-070760 A | 4/1983 |
| JP | S59-126000 A | 7/1984 |
| JP | H01-203449 A | 8/1989 |
| JP | H10-509485 A | 9/1998 |
| JP | 2005-060665 A | 3/2005 |
| JP | 2006-089906 A | 4/2006 |
| JP | 2006-312714 A | 11/2006 |
| JP | 2012-136412 A | 7/2012 |
| JP | 2016-044253 A | 4/2016 |
| JP | 2016-098285 A | 5/2016 |
| JP | 2017-052843 A | 3/2017 |
| WO | 96/015075 A1 | 5/1996 |

OTHER PUBLICATIONS

International Search Report issued in corresponding International Patent Application No. PCT/JP2021/001633 dated Apr. 20, 2021.
International Preliminary Report on Patentability and Written Opinion issued in corresponding International Patent Application No. PCT/JP2021/001633 dated Sep. 15, 2022.

* cited by examiner

*Primary Examiner* — George R Koch
*Assistant Examiner* — Christopher C Caillouet
(74) *Attorney, Agent, or Firm* — Morgan, Lewis & Bockius LLP

(57) ABSTRACT

Provided is a binder including a polymer having a hydroxyl group, wherein the polymer includes a structural unit derived from an unsaturated carboxylic acid-based monomer, and a structural unit derived from at least one hydroxyl group-containing monomer selected from the group consisting of 2-hydroxyethyl acrylate, allyl alcohol, and isoprenol, the content of the structural unit derived from the hydroxyl group-containing monomer is 5 mol % to 50 mol % based on the total amount of the polymer, the weight average molecular weight of the polymer is 1000 to 5000, and the pH is 6.5 or lower.

20 Claims, No Drawings

BINDER AND BONDED OBJECT

TECHNICAL FIELD

The present invention relates to a binder and a fixed body.

BACKGROUND ART

Heat-resistant formed bodies prepared by attaching a binder to glass fibers or the like and forming those glass fibers into mats are widely used as thermal insulation materials for houses and storehouses, apparatuses and devices, and the like. As the binder, phenol-formaldehyde binders are widely used. However, the phenol-formaldehyde binders have a problem that unreacted formaldehyde remains in formed bodies, and formaldehyde is released after construction of houses or the like. Thus, a binder which does not release formaldehyde has been examined.

For example, in Patent Literature 1, as a binder that does not emit formaldehyde, there has been proposed a binder for mineral fibers formed from a vinyl copolymer having an organic acid (salt) group and a hydroxyl group and having a weight average molecular weight of 500 to 100000.

CITATION LIST

Patent Literature

Patent Literature 1: Japanese Unexamined Patent Publication No. 2006-89906

SUMMARY OF INVENTION

Technical Problem

Incidentally, it is desirable that a heat-resistant formed body obtainable by attaching a binder to glass fibers or the like has high strength. Furthermore, in order to reduce the variation in strength within the heat-resistant formed body, it is desirable that the binder has high impregnatability with respect to glass fibers or the like. However, it has been conventionally difficult to achieve both high strength and high impregnatability.

Thus, it is an object of the present invention to provide a binder capable of achieving both sufficiently high strength and impregnatability, and a fixed body using this binder.

Solution to Problem

In view of the above-described circumstances, the inventors of the present invention repeatedly conducted thorough investigations, and as a result, the inventors completed the inventions described in the following items [1] to [3].

[1] A binder including a polymer having a hydroxyl group,
wherein the polymer includes a structural unit derived from an unsaturated carboxylic acid-based monomer, and a structural unit derived from at least one hydroxyl group-containing monomer selected from the group consisting of 2-hydroxyethyl acrylate, allyl alcohol, and isoprenol,
the content of the structural unit derived from the hydroxyl group-containing monomer is 5 mol % to 50 mol % based on the total amount of the polymer,
the weight average molecular weight of the polymer is 1000 to 5000, and the pH is 6.5 or lower.

[2] The binder according to [1], wherein the unsaturated carboxylic acid-based monomer is acrylic acid.

[3] A fixed body including an inorganic filler and a cured product of the binder according to [1] or [2] fixing the inorganic filler.

Advantageous Effects of Invention

According to the present invention, a binder capable of achieving both sufficiently high strength and impregnatability, and a fixed body using this binder can be provided.

DESCRIPTION OF EMBODIMENTS

Hereinafter, embodiments of the present invention will be described in detail; however, the present invention is not intended to be limited to these. Incidentally, in the present specification, "(meth)acrylate" means "acrylate" or "methacrylate". The same also applies to other similar expressions such as "(meth)acrylic acid".

<Binder>

The binder of the present embodiment includes a polymer having a hydroxyl group. The polymer includes a structural unit derived from an unsaturated carboxylic acid-based monomer, and a structural unit derived from a hydroxyl group-containing monomer. Hereinafter, the binder will be described in detail.

The unsaturated carboxylic acid-based monomer of the present embodiment may be a monomer having a carbon-carbon double bond and a carboxylic acid moiety; however, for example, an unsaturated carboxylic acid-based monomer represented by the following General Formula (1) may be mentioned.

[Chem. 1]

[In General Formula (1), $R^1$, $R^2$, and $R^3$, which are identical or different, each represent a hydrogen atom, a methyl group, or $-(CH_2)_z COOM^1$ group; the $-(CH_2)_z COOM^1$ group may form an anhydride with a $-COOX$ group or another $-(CH_2)_z COOM^1$ group; z represents an integer of 0 to 2; $M^1$ represents a hydrogen atom, an alkali metal, an alkaline earth metal, an ammonium group, an organic ammonium group, or an organic amine group; and X represents a hydrogen atom, a methyl group, an ethyl group, an alkali metal, an alkaline earth metal, an ammonium group, an organic ammonium group, or an organic amine group.]

Examples of the unsaturated carboxylic acid-based monomer represented by General Formula (1) include monocarboxylic acid-based monomers such as (meth)acrylic acid and crotonic acid, or salts of these; dicarboxylic acid-based monomers such as maleic acid, itaconic acid, and fumaric acid, or salts of these; and anhydrides of dicarboxylic acid-based monomers such as maleic acid, itaconic acid, and fumaric acid, or salts of these. Examples of the salts as used herein include alkali metal salts, alkaline earth metal salts, ammonium salts, organic ammonium salts, and organic amine salts. Examples of the alkali metal salts include lithium salts, sodium salts, and potassium salts. Examples of the alkaline earth metal salts include calcium salts and magnesium salts. Examples of the organic ammonium salts include methylammonium salts, ethylammonium salts, dimethylammonium salts, diethylammonium salts, trimethylammonium salts, and triethylammonium salts. Examples of the organic amine salts include alkanolamine salts such as ethanolamine salts, diethanolamine salts, and triethanolamine salts.

From the viewpoint of sufficiently exhibiting the effects of the present invention, the unsaturated carboxylic acid-based monomer represented by General Formula (1) is preferably (meth)acrylic acid or a salt thereof, maleic acid or a salt thereof, or maleic anhydride; more preferably acrylic acid or a salt thereof, or maleic acid or a salt thereof; and even more preferably acrylic acid.

Regarding the unsaturated carboxylic acid-based monomer, one kind thereof may be used alone, or two or more kinds thereof may be used in combination.

The hydroxyl group-containing monomer of the present embodiment is at least one selected from the group consisting of 2-hydroxyethyl acrylate, allyl alcohol, and isoprenol, and the monomer is preferably 2-hydroxyethyl acrylate.

The content of the structural unit derived from the hydroxyl group-containing monomer in the polymer of the present embodiment is 5 mol % to 50 mol %, preferably 10 mol % to 45 mol %, and more preferably 20 mol % to 40 mol %.

The weight average molecular weight of the polymer of the present embodiment is 1000 to 5000, preferably 2000 to 5000, and more preferably 3000 to 4500. The weight average molecular weight can be measured by, for example, the method described in the Examples.

The polymer of the present embodiment can be obtained by polymerizing the above-mentioned unsaturated carboxylic acid-based monomer and hydroxyl group-containing monomer by a conventionally known method. For example, it is preferable to use a polymer produced by a solution polymerization method, in which the above-mentioned unsaturated carboxylic acid-based monomer and hydroxyl group-containing monomer are polymerized in water in the presence of a polymerization initiator and a chain transfer agent under heating and reflux conditions, or the like. Regarding the polymerization initiator, sodium persulfate is preferred. Regarding the chain transfer agent, sodium hypophosphite or sodium bisulfate is preferred.

The binder of the present embodiment can be prepared into an aqueous solution including the above-mentioned polymer having a hydroxyl group.

The pH of this aqueous solution is 6.5 or lower, preferably 1 or higher and lower than 5, more preferably 1.5 or higher and 4.5 or lower, and even more preferably 2 or higher and lower than 4.

The content of the hydroxyl group-containing monomer in the binder of the present embodiment can be set to, for example, 10% to 90% by mass, preferably 15% to 80% by mass, and more preferably 20% to 70% by mass.

The binder of the present embodiment may include other components in addition to the above-mentioned polymer. Examples of the other components include an antirust agent, a curing accelerator, and a crosslinking agent.

Examples of the antirust agent include an azole-based antirust agent, a benzotriazole-based antirust agent, a tetrazole-based antirust agent, an imidazole-based antirust agent, a benzimidazole-based antirust agent, a naphthimidazole-based antirust agent, a thiazole-based antirust agent, and a thiocarbamic acid-based antirust agent. These may be used singly, or two or more kinds thereof may be used in combination.

Examples of the curing accelerator include phosphorus-containing compounds; protonic acids (sulfuric acid, carboxylic acid, carbonic acid, and the like) and salts thereof (metal (alkali metal, alkaline earth metal, transition metal, Group 2B, Group 4A, Group 4B, Group 5B, and the like) salts, ammonium salts, and the like); and oxides, chlorides, hydroxides, and alkoxides of metals (above-described metals). Examples of the phosphorus-containing compounds include acid group-containing compounds such as hypophosphorous acid (salts), phosphorous acid (salts), phosphoric acid (salts), pyrophosphoric acid (salts), polyphosphoric acid (salts), and organic phosphoric acid (salts) (also including hydrates of these); and organic phosphorus compounds such as trimethylphosphine, triphenylphosphine, and triphenylphosphine oxide. These may be used singly, or two or more kinds thereof may be used in combination.

Regarding the crosslinking agent, a compound having two or more hydroxyl groups and/or amino groups in one molecule, or the like can be used. Preferred examples of the crosslinking agent include an alkanediol such as ethylene glycol, propylene glycol, 1,3-propanediol, butylene glycol, 1,4-butanediol, 1,5-pentanediol, or 1,6-hexanediol; a (poly) oxyalkylene glycol such as diethylene glycol, triethylene glycol, or a polyalkylene glycol; a trihydric or higher alcohol such as glycerin, polyglycerin, erythritol, xylitol, or sorbitol; an alkanolamine such as monoethanolamine, diethanolamine, or triethanolamine; a polyamine such as ethylenediamine or diethylenetriamine; and a polyol in which an alkylene oxide is added to the polyamine. These may be used singly, or two or more kinds thereof may be used in combination.

The above-mentioned binder can be suitably used for fixing an inorganic filler or an organic filler. Furthermore, the above-mentioned binder can be suitably used as a binder for a thermal insulating material.

Examples of the inorganic filler include inorganic fibers such as glass fibers, rockwool, and carbon fibers; and inorganic particles (inorganic powders) such as powdered glass, glass particles (glass beads), and mineral particles. Among these, from the viewpoint that the fixed body is widely applicable to thermal insulating materials and the like, the inorganic filler is preferably glass fibers or powdered glass.

Examples of the organic filler include fibers of organic materials such as wool, cellulose, hemp, nylon, and polyester; and particles of organic materials (powders of organic materials), such as nylon microparticles and polyester microparticles.

<Fixed Body>

The fixed body of the present embodiment includes an inorganic filler and a cured product of the above-mentioned binder that fixes the inorganic filler. Regarding the inorganic filler, the above-mentioned ones can be used. The fixed body can be produced by, for example, a method for producing a fixed body that will be described below.

<Method for Producing Fixed Body>

The method for producing a fixed body of the present embodiment includes a contacting step of bringing a binder and an inorganic filler into contact with each other to obtain an intermediate; and a heating step of heating the intermediate. As the binder and the inorganic filler, each of the above-mentioned ones can be used.

Examples of a method of bringing a binder into contact with an inorganic filler include a method of impregnating the inorganic filler with the binder, and a method of spraying the binder onto the inorganic filler. Among these, from the viewpoint that it is easy to regulate the amount of attachment of the binder, a method of spraying the binder onto the inorganic filler is preferred. Incidentally, the amount of attachment of the binder refers to the amount of the binder actually attached to the inorganic filler after the contacting step.

The amount of attachment of the binder in terms of solid content is preferably 1 to 40 parts by mass, more preferably 1 to 30 parts by mass, and even more preferably 1 to 30 parts by mass, with respect to 100 parts by mass of the inorganic filler. When the amount of attachment of the binder is in the above-described range, the mechanical strength of the fixed body produced tends to be enhanced.

In the heating step, by heating the intermediate, at least a carboxyl group-containing polymer in the intermediate is cured, and then the intermediate on the whole is cured. The heating temperature and the heating time for the heating step can be set to, for example, 100° C. to 300° C. and 1 to 120 minutes; however, from the viewpoint of operability, it is preferable to carry out the heating step at a low temperature for a short period of time. For example, the heating temperature is preferably 120° C. to 250° C., more preferably 140° C. to 230° C., and even more preferably 150° C. to 200° C. Furthermore, the heating time is preferably 1 to 60 minutes, more preferably 1 to 45 minutes, and even more preferably 1 to 30 minutes.

EXAMPLES

The present invention will be described in more detail by way of Examples; however, the present invention is not intended to be limited to these Examples only. Incidentally, unless particularly stated otherwise, the unit "%" is intended to mean "% by mass".

The aqueous polymer solutions (binders) obtained in Examples and Comparative Examples were evaluated by the following methods. The results are presented in Table 1.

<Measurement Conditions for Weight Average Molecular Weight, Number Average Molecular Weight, and Dispersity>

The weight average molecular weight (Mw), the number average molecular weight (Mn), and the dispersity (Mw/Mn) were measured under the following conditions.
Apparatus: HLC-8320GPC manufactured by Tosoh Corporation
Detector: RI
Column: TSK-GEL G3000PWXL manufactured by Tosoh Corporation
Column temperature: 35° C.
Flow rate: 0.5 ml/min
Calibration curve: POLY SODIUM ACRYLATE STANDARD manufactured by Sowa Kagaku K. K.
Eluent: Solution obtained by diluting a mixture of sodium dihydrogen phosphate dodecahydrate/disodium hydrogen phosphate dihydrate (34.5 g/46.2 g) with 5000 g of pure water <Method for Measuring Solid Content of Aqueous Polymer Solution after Completion of Polymerization>

An aqueous polymer solution was subjected to a drying treatment by leaving the aqueous polymer solution to stand for 60 minutes in an oven heated to 130° C. The solid content (%) of the aqueous polymer solution after the completion of polymerization was calculated from the weight change before and after drying.

<Production of Test Specimen>

A test specimen for measuring mechanical strength was produced as follows.
(i) Pure water was added to an aqueous polymer solution, and the content of the polymer component was adjusted to be 35%.
(ii) The binder obtained in (i) was added to glass beads having a particle size of 0.50 to 0.150 mm such that the amount of the polymer component was 5.0% of the glass bead weight, and the binder and the glass beads were sufficiently mixed.
(iii) The mixture obtained in (ii) was pushed into a release-treated mold form having a size of 120 mm×20 mm×5 mm to be molded, dried for 30 minutes in an oven at 210° C., and then cooled for 30 minutes at room temperature to obtain a test specimen.

<Mechanical Strength of Test Specimen>

For the above-described test specimen, the flexural strength was measured according to JIS K7171 at a testing rate of 2 mm/min. The flexural strength of three sheets of the test specimen was measured, and the average value was calculated. Furthermore, the standard deviation of the values at that time was calculated, and the variation in the values was checked.

The flexural strength is preferably 15 MPa or higher, more preferably 17.5 MPa or higher, and even more preferably 20 MPa or higher.

The standard deviation is preferably 1.5 or less, more preferably 1.0 or less, and even more preferably 0.5 or less.

<Method for Evaluating Impregnatability Against Glass Beads>

30 g of glass beads having a particle size of 0.50 to 0.150 mm were placed at a uniform height in a Petri dish having a diameter of 120 mm, and 3 g of an aqueous polymer solution having the content of a polymer component adjusted to 35% was slowly added dropwise to the center of the Petri dish. After the completion of dropwise addition, the spread area of the aqueous polymer solution on the glass beads after a time lapse of 10 seconds was calculated. The areas were classified according to the following criteria, and the impregnatability were evaluated.
A: 25 cm$^2$ or more
B: 20 cm$^2$ or more and less than 25 cm$^2$
C: 15 cm$^2$ or more and less than 20 cm$^2$
D: less than 15 cm$^2$ <Method for Measuring pH>

For an aqueous solution (adjusted to 25° C.) in which the solid content was adjusted to 35% by adding pure water to an aqueous polymer solution, the pH value was measured by using a pH meter (HORIBA D-51).

Example 1

132.2 g of pure water was introduced (initial preparation) into a glass separable flask having a capacity of 0.5 liters and equipped with a reflux condenser, a stirrer, and a thermometer, and the temperature was raised to the boiling point under stirring. Next, into the polymerization reaction system in a boiling-point reflux state under stirring, 138.6 g (1.54 mol) of an 80 mass % aqueous solution of acrylic acid (hereinafter, referred to as "80% AA") for 180 minutes, 74.1 g (0.64 mol) of 100 mass % hydroxyethyl acrylate (hereinafter, referred to as "100% HEA") for 180 minutes, 33.8 g of a 5 mass % aqueous solution of sodium persulfate (hereinafter, referred to as "5% NaPS") for 195 minutes, and a 15 mass % aqueous solution of sodium hypophosphite (hereinafter, referred to as "15% SHP") at two stages of supply rates such as 13.8 g for 18 minutes and subsequently 55.4 g for 162 minutes, were respectively added dropwise through tip nozzles via separate supply routes. The dropwise addition of each component was continuously carried out at a constant dropping rate, except for 15% SHP. After the completion of dropwise addition of 80% AA, the reaction solution was further maintained (aged) in a boiling-point reflux state for 30 minutes. The solid content of the obtained aqueous polymer solution was 44.8%, the weight average molecular weight (Mw) was 4300, and the quantity of residual monomers in the polymer confirmed by LC was 5 ppm or less.

Example 2

162.7 g of pure water was introduced (initial preparation) into a glass separable flask having a capacity of 0.5 liters and equipped with a reflux condenser, a stirrer, and a thermometer, and the temperature was raised to the boiling point under stirring. Next, into the polymerization reaction system in a boiling-point reflux state under stirring, 138.6 g (1.54 mol) of 80% AA for 180 minutes, 69.0 g (0.59 mol) of 100% HEA for 180 minutes, 33.1 g of 5% NaPS for 195 minutes, and 15% SHP at two stages of supply rates such as 16.2 g for 18 minutes and subsequently 64.5 g for 162 minutes, were respectively added dropwise through tip nozzles via separate supply routes. The dropwise addition of each component was continuously carried out at a constant dropping rate, except for 15% SHP. After the completion of dropwise addition of 80% AA, the reaction solution was further maintained (aged) in a boiling-point reflux state for 30 minutes. The solid content of the obtained aqueous polymer solution was 39.7%, the weight average molecular weight (Mw) was 3500, and the quantity of residual monomers in the polymer confirmed by LC was 5 ppm or less.

Example 3

135.2 g of pure water was introduced (initial preparation) into a glass separable flask having a capacity of 0.5 liters and equipped with a reflux condenser, a stirrer, and a thermometer, and the temperature was raised to the boiling point under stirring. Next, into the polymerization reaction system in a boiling-point reflux state under stirring, 138.6 g (1.54 mol) of 80% AA for 180 minutes, 74.1 g (0.64 mol) of 100% HEA for 180 minutes, 33.8 g of 5% NaPS for 195 minutes, and a 15 mass % aqueous solution of sodium hypophosphite (hereinafter, referred to as "15% SHP") at two stages of supply rates such as 12.9 g for 18 minutes and subsequently 51.7 g for 162 minutes, were respectively added dropwise through tip nozzles via separate supply routes. The dropwise addition of each component was continuously carried out at a constant dropping rate, except for 15% SHP. After the completion of dropwise addition of 80% AA, the reaction solution was further maintained (aged) in a boiling-point reflux state for 30 minutes. The solid content of the obtained aqueous polymer solution was 44.9%, the weight average molecular weight (Mw) was 4800, and the quantity of residual monomers in the polymer confirmed by LC was 5 ppm or less.

Example 4

200.3 g of pure water was introduced (initial preparation) into a glass separable flask having a capacity of 0.5 liters and equipped with a reflux condenser, a stirrer, and a thermometer, and the temperature was raised to the boiling point under stirring. Next, into the polymerization reaction system in a boiling-point reflux state under stirring, 118.9 g (1.32 mol) of 80% AA for 180 minutes, 102.1 g (0.88 mol) of 100% HEA for 180 minutes, 34.1 g of 5% NaPS for 195 minutes, and 15% SHP at two stages of supply rates such as 13.0 g for 18 minutes and subsequently 52.0 g for 162 minutes, were respectively added dropwise through tip nozzles via separate supply routes. The dropwise addition of each component was continuously carried out at a constant dropping rate, except for 15% SHP. After the completion of dropwise addition of 80% AA, the reaction solution was further maintained (aged) in a boiling-point reflux state for 30 minutes. The solid content of the obtained aqueous polymer solution was 40.9%, the weight average molecular weight (Mw) was 4900, and the quantity of residual monomers in the polymer confirmed by LC was 5 ppm or less.

Example 5

149.5 g of pure water was introduced (initial preparation) into a glass separable flask having a capacity of 0.5 liters and equipped with a reflux condenser, a stirrer, and a thermometer, and the temperature was raised to the boiling point under stirring. Next, into the polymerization reaction system in a boiling-point reflux state under stirring, 149.9 g (1.66 mol) of 80% AA for 180 minutes, 49.5 g (0.43 mol) of 100% HEA for 180 minutes, 33.1 g of 5% NaPS for 195 minutes, and 15% SHP at two stages of supply rates such as 15.2 g for 18 minutes and subsequently 60.6 g for 162 minutes, were respectively added dropwise through tip nozzles via separate supply routes. The dropwise addition of each component was continuously carried out at a constant dropping rate, except for 15% SHP. After the completion of dropwise addition of 80% AA, the reaction solution was further maintained (aged) in a boiling-point reflux state for 30 minutes. The solid content of the obtained aqueous polymer solution was 40.5%, the weight average molecular weight (Mw) was 3800, and the quantity of residual monomers in the polymer confirmed by LC was 5 ppm or less.

Example 6

93.8 g of pure water was introduced (initial preparation) into a glass separable flask having a capacity of 0.5 liters and equipped with a reflux condenser, a stirrer, and a thermometer, and the temperature was raised to 85° C. under stirring. Next, into the polymerization reaction system in a state of being maintained at 85° C. under stirring, 111.2 g (1.23 mol) of 80% AA for 120 minutes, 88.8 g (0.77 mol) of 100% HEA for 120 minutes, 29.2 g of 5% NaPS for 180 minutes, 5.8 g of a 48 mass % aqueous solution of sodium hydroxide (hereinafter, referred to as "48% NaOH") for 120 minutes, and 75.8 g of a 20 mass % aqueous solution of sodium bisulfate (hereinafter, referred to as "20% SBS") for 110 minutes, were respectively added dropwise at the above-described supply rates through tip nozzles via separate supply routes. All of the dropwise addition of each component was continuously carried out at a constant dropping rate. After the completion of dropwise addition of 80% AA, the reaction solution was further maintained (aged) in a boiling-point reflux state for 90 minutes. The solid content of the obtained aqueous polymer solution was 47.6%, the weight average molecular weight (Mw) was 4600, and the quantity of residual monomers in the polymer confirmed by LC was 5 ppm or less.

Example 7

112.0 g of pure water was introduced (initial preparation) into a glass separable flask having a capacity of 0.5 liters and equipped with a reflux condenser, a stirrer, and a thermometer, and the temperature was raised to the boiling point under stirring. Next, into the polymerization reaction system in a boiling-point reflux state under stirring, 160.0 g (1.78 mol) of 80% AA for 180 minutes, 38.2 g (0.44 mol) of 100% isoprenol for 180 minutes, 73.9 g of 5% NaPS for 195 minutes, and 15% SHP at two stages of supply rates such as 12.6 g for 18 minutes and subsequently 50.2 g for 162 minutes, were respectively added dropwise through tip nozzles via separate supply routes. The dropwise addition of each component was continuously carried out at a constant dropping rate, except for 15% SHP. After the completion of dropwise addition of 80% AA, the reaction solution was further maintained (aged) in a boiling-point reflux state for 30 minutes. The solid content of the obtained aqueous polymer solution was 40.2%, the weight average molecular weight (Mw) was 4300, and the quantity of residual monomers in the polymer confirmed by LC was 5 ppm or less.

Example 8

115.5 g of pure water was introduced (initial preparation) into a glass separable flask having a capacity of 0.5 liters and equipped with a reflux condenser, a stirrer, and a thermometer, and the temperature was raised to the boiling point under stirring. Next, into the polymerization reaction system in a boiling-point reflux state under stirring, 165.0 g (1.83 mol) of 80% AA for 180 minutes, 45.6 g (0.79 mol) of 100% allyl alcohol for 180 minutes, 62.3 g of 5% NaPS for 195 minutes, and 15% SHP at two stages of supply rates such as 14.8 g for 18 minutes and subsequently 59.2 g for 162 minutes, were respectively added dropwise through tip nozzles via separate supply routes. The dropwise addition of each component was continuously carried out at a constant dropping rate, except for 15% SHP. After the completion of dropwise addition of 80% AA, the reaction solution was further maintained (aged) in a boiling-point reflux state for 30 minutes. The solid content of the obtained aqueous polymer solution was 41.5%, the weight average molecular weight (Mw) was 4900, and the quantity of residual monomers in the polymer confirmed by LC was 5 ppm or less.

Comparative Example 1

185.3 g of pure water was introduced (initial preparation) into a glass separable flask having a capacity of 0.5 liters and equipped with a reflux condenser, a stirrer, and a thermometer, and the temperature was raised to the boiling point under stirring. Next, into the polymerization reaction system in a boiling-point reflux state under stirring, 138.6 g (1.54 mol) of 80% AA for 180 minutes, 69.0 g (0.59 mol) of 100% HEA for 180 minutes, 33.1 g of 5% NaPS for 195 minutes, and 15% SHP at two stages of supply rates such as 8.9 g for 18 minutes and subsequently 35.5 g for 162 minutes, were respectively added dropwise through tip nozzles via separate supply routes. The dropwise addition of each component was continuously carried out at a constant dropping rate, except for 15% SHP. After the completion of dropwise addition of 80% AA, the reaction solution was further maintained (aged) in a boiling-point reflux state for 30 minutes. The solid content of the obtained aqueous polymer solution was 41.0%, the weight average molecular weight (Mw) was 9500, and the quantity of residual monomers in the polymer confirmed by LC was 5 ppm or less.

Comparative Example 2

272.4 g of pure water was introduced (initial preparation) into a glass separable flask having a capacity of 0.5 liters and equipped with a reflux condenser, a stirrer, and a thermometer, and the temperature was raised to the boiling point under stirring. Next, into the polymerization reaction system in a boiling-point reflux state under stirring, 79.3 g (0.88 mol) of 80% AA for 180 minutes, 153.1 g (1.32 mol) of 100% HEA for 180 minutes, 34.1 g of 5% NaPS for 195 minutes, and 15% SHP at two stages of supply rates such as 11.0 g for 18 minutes and subsequently 44.0 g for 162 minutes, were respectively added dropwise through tip nozzles via separate supply routes. The dropwise addition of each component was continuously carried out at a constant dropping rate, except for 15% SHP. After the completion of dropwise addition of 80% AA, the reaction solution was further maintained (aged) in a boiling-point reflux state for 30 minutes. The solid content of the obtained aqueous polymer solution was 37.8%, the weight average molecular weight (Mw) was 5600, and the quantity of residual monomers in the polymer confirmed by LC was 5 ppm or less.

Comparative Example 3

114.1 g of pure water was introduced (initial preparation) into a glass separable flask having a capacity of 0.5 liters and equipped with a reflux condenser, a stirrer, and a thermometer, and the temperature was raised to the boiling point under stirring. Next, into the polymerization reaction system in a boiling-point reflux state under stirring, 126.0 g (1.40 mol) of 80% AA for 180 minutes, 70.2 g (0.54 mol) of 100% HEMA for 180 minutes, 30.1 g of 5% NaPS for 195 minutes, and 15% SHP at two stages of supply rates such as 15.7 g for 18 minutes and subsequently 62.7 g for 162 minutes, were respectively added dropwise through tip nozzles via separate supply routes. The dropwise addition of each component was continuously carried out at a constant dropping rate, except for 15% SHP. After the completion of dropwise addition of 80% AA, the reaction solution was further maintained (aged) in a boiling-point reflux state for 30 minutes. The solid content of the obtained aqueous polymer solution was 45.6%, the weight average molecular weight (Mw) was 4800, and the quantity of residual monomers in the polymer confirmed by LC was 5 ppm or less.

TABLE 1

| | Mw | Mn | Mw/Mn | Strength [MPa] | Standard deviation | impregnatability | pH |
|---|---|---|---|---|---|---|---|
| Example 1 | 4300 | 2050 | 2.10 | 20.53 | 0.46 | A | 2.5 |
| Example 2 | 3500 | 2020 | 1.73 | 19.00 | 0.64 | A | 2.5 |
| Example 3 | 4800 | 2180 | 2.20 | 20.67 | 0.67 | B | 2.5 |
| Example 4 | 4900 | 2200 | 2.23 | 18.70 | 0.87 | B | 2.5 |
| Example 5 | 3800 | 2060 | 1.84 | 20.83 | 0.50 | A | 2.4 |
| Example 6 | 4600 | 2010 | 2.29 | 18.35 | 0.91 | B | 2.9 |
| Example 7 | 4300 | 1970 | 2.18 | 18.61 | 0.40 | A | 2.4 |
| Example 8 | 4900 | 2000 | 2.45 | 16.72 | 0.87 | B | 2.5 |
| Comparative Example 1 | 9500 | 3530 | 2.69 | 18.15 | 2.21 | D | 2.3 |
| Comparative Example 2 | 5600 | 2300 | 2.43 | 10.12 | 1.08 | C | 2.8 |
| Comparative Example 3 | 4800 | 1950 | 2.46 | 21.20 | 1.53 | D | 2.6 |

The invention claimed is:

1. A binder comprising a polymer having a hydroxyl group,
wherein the polymer includes a structural unit derived from an unsaturated carboxylic acid-based monomer, and a structural unit derived from at least one hydroxyl group-containing monomer selected from the group consisting of 2-hydroxyethyl acrylate, allyl alcohol, and isoprenol,
the content of the structural unit derived from the hydroxyl group-containing monomer is 5 mol % to 50 mol % based on the total amount of the polymer,
the weight average molecular weight of the polymer is 1000 to 5000, and
the pH is 6.5 or lower.

2. The binder according to claim 1, wherein the unsaturated carboxylic acid-based monomer is acrylic acid.

3. A fixed body comprising an inorganic filler and a cured product of the binder according to claim 2 fixing the inorganic filler.

4. The fixed body according to claim 3, wherein the inorganic filler is glass fibers or a powdered glass.

5. A fixed body comprising an organic filler and a cured product of the binder according to claim 2 fixing the organic filler.

6. The fixed body according to claim 5, wherein the organic filler comprises wool fibers, cellulose fibers, hemp fibers, nylon fibers, nylon microparticles, polyester fibers, or polyester microparticles.

7. A fixed body comprising an inorganic filler and a cured product of the binder according to claim 1 fixing the inorganic filler.

8. The fixed body according to claim 7, wherein the inorganic filler is glass fibers or a powdered glass.

9. The binder according to claim 1, wherein the weight average molecular weight of the polymer is from 2000 to 5000.

10. The binder according to claim 1, wherein the weight average molecular weight of the polymer is from 3000 to 4500.

11. The binder according to claim 1, wherein the weight average molecular weight of the polymer is from 3500 to 4900.

12. The binder according to claim 11, wherein the number average molecular weight of the polymer is from 1970 to 2200.

13. The binder according to claim 12, wherein the polymer has a dispersity (Mw/Mn) from 1.73 to 2.45.

14. The binder according to claim 1, wherein the number average molecular weight of the polymer is from 1970 to 2200.

15. The binder according to claim 1, wherein the polymer has a dispersity (Mw/Mn) from 1.73 to 2.45.

16. The binder according to claim 1, wherein structural unit derived from at least one hydroxyl group-containing monomer comprises allyl alcohol.

17. The binder according to claim 1, wherein the structural unit derived from at least one hydroxyl group-containing monomer comprises isoprenol.

18. The binder according to claim 1, wherein the binder excludes a protonic acid.

19. A fixed body comprising an organic filler and a cured product of the binder according to claim 1 fixing the organic filler.

20. The fixed body according to claim 19, wherein the organic filler comprises wool fibers, cellulose fibers, hemp fibers, nylon fibers, nylon microparticles, polyester fibers, or polyester microparticles.

* * * * *